(12) United States Patent
Schlachet

(10) Patent No.: US 10,679,199 B2
(45) Date of Patent: Jun. 9, 2020

(54) ACTIVE MONITORING OF DEVICES AND SYSTEMS

(71) Applicant: REVEL SYSTEMS, INC., San Francisco, CA (US)

(72) Inventor: Jason Samuel Schlachet, San Francisco, CA (US)

(73) Assignee: Revel Systems, Inc., San Francisco, CA (US)

( * ) Notice: Subject to any disclaimer, the term of this patent is extended or adjusted under 35 U.S.C. 154(b) by 328 days.

(21) Appl. No.: 15/703,938

(22) Filed: Sep. 13, 2017

(65) Prior Publication Data

US 2019/0080306 A1 Mar. 14, 2019

(51) Int. Cl.
| | |
|---|---|
| G06Q 20/20 | (2012.01) |
| G06F 11/30 | (2006.01) |
| G06F 11/32 | (2006.01) |
| G07G 1/00 | (2006.01) |

(52) U.S. Cl.
CPC .......... *G06Q 20/20* (2013.01); *G06F 11/302* (2013.01); *G06F 11/3006* (2013.01); *G06F 11/327* (2013.01); *G07G 1/0009* (2013.01)

(58) Field of Classification Search
CPC ... G06Q 20/20; G06F 11/3006; G06F 11/302; G06F 11/327; G07G 1/0009
See application file for complete search history.

(56) References Cited

U.S. PATENT DOCUMENTS

| | | | |
|---|---|---|---|
| 10,187,494 B2 * | 1/2019 | Stewart | ................... H04L 67/34 |
| 10,275,738 B1 * | 4/2019 | Manuilov | ............ G06Q 10/087 |
| 2013/0212574 A1 * | 8/2013 | Hutchinson | ........... H04L 41/082 |
| | | | 717/172 |

* cited by examiner

*Primary Examiner* — A. Hunter Wilder
*Assistant Examiner* — Joseph M Mutschler
(74) *Attorney, Agent, or Firm* — Wiley Rein LLP

(57) ABSTRACT

Embodiments of the present invention include systems and methods for monitoring status of one or more devices at a point-of-sales (POS) establishment via a network. In embodiments, the system for monitoring the devices includes a monitoring device that receives a device manifest including information of one or more devices preconfigured for installation at a POS establishment from a backend server via the network. In embodiments, the backend server preconfigures the monitoring device before the monitoring device is installed in the POS establishment. In embodiments, the monitoring device configures monitoring software using the device manifest and sends information of the configured monitoring software to a monitoring server via the network. In embodiments, the monitoring software collects status information of the devices and sends the collected status information to the monitoring server via the network.

10 Claims, 10 Drawing Sheets

SSH Tunnels 500

| Name | Endpoint | Last Contacted | Requested | Status | Actions |
|---|---|---|---|---|---|
| Client 1 | t1.company.com:3000 | 25 min ago | ON | ON | Toggle |
| Client 2 | (none) | 2 hours ago | OFF | OFF | Toggle |
| Client 3 | (none) | 2 days ago | OFF | OFF | Toggle |
| Client 4(1) | t1.company.com:3001 | 11 hours ago | OFF | OFF | Toggle |
| Client 4(2) | (none) | 4 days ago | ON | OFF | Toggle |
| Client 4(3) | (none) | 5 hours ago | OFF | OFF | Toggle |
| Client 4(4) | (none) | 6 hours ago | OFF | OFF | Toggle |
| ... | ... | ... | ... | ... | ... |

FIG. 5

User permission 1000

ACCOUNT INFORMATION

Login ▭
Email ▭     Login detail of portal user 1002
Password ▭

Full Access ☐
Staff ☐        Switches 1004
Notify ☐

Account age: 13 days

SUBMIT  — 1006

PERMISSIONS: ADD/REMOVE

Table of devices visible to user 1010

| URL | Establishment | Bundle/version | Last contacted | Last IP | Actions |
|---|---|---|---|---|---|
| Sffsupport | 1> | bin=9 cfg=7 | 10 days ago | None | View/Record/remove |
| Test0018 | 1> | bin=9 cfg=7 | 20 days ago | 127.0.0.1 | View/Record/remove |
| Test0018 | 1> | bin=9 cfg=7 | 20 days ago | 127.0.0.1 | View/Record/remove |
| Test0018 | 1> | bin=9 cfg=7 | 20 days ago | 127.0.0.1 | View/Record/remove |

FIG. 10

ACTIVE MONITORING OF DEVICES AND SYSTEMS

TECHNICAL FIELD

The present invention relates to monitoring remote systems, more particularly, to systems and methods for actively monitoring point-of-sales (POS) systems via a network.

DESCRIPTION OF THE RELATED ART

In general, POS refers to a place where a retail transaction between a merchant and a customer is performed. It is the point where a customer makes a payment to the merchant in exchange for goods or services. At POS, the merchant typically calculates the amount owed by the customer and/or prepares an invoice for the customer, and the customer pays the amount in various formats, such as signing on a printed receipt or an electrical panel.

To perform the transactions, each POS system in the client side uses hardware or software tailored to its particular needs. For instance, a POS may include a touch screen tablet and peripherals, such as receipt printers and credit card payment terminals, that together enable a merchant to transact with customers. While the POS application installed in the tablet may report the transaction information to a computer of the merchant, the general status of the entire POS system in the client side, such as availability and status of peripherals and Internet connection, is not known to a support organization until a support call is made to the support organization by the client. Thus, there is a need for systems and methods for actively monitoring the POS systems and proactively alert the merchant when the POS operations are hindered or down.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 5 shows an exemplary secure shell (SSH) tunnel page according to embodiments of the present disclosure.

FIG. 10 shows an exemplary user permissions page according to embodiments of the present disclosure.

DETAILED DESCRIPTION OF THE PREFERRED EMBODIMENTS

Figure 1:
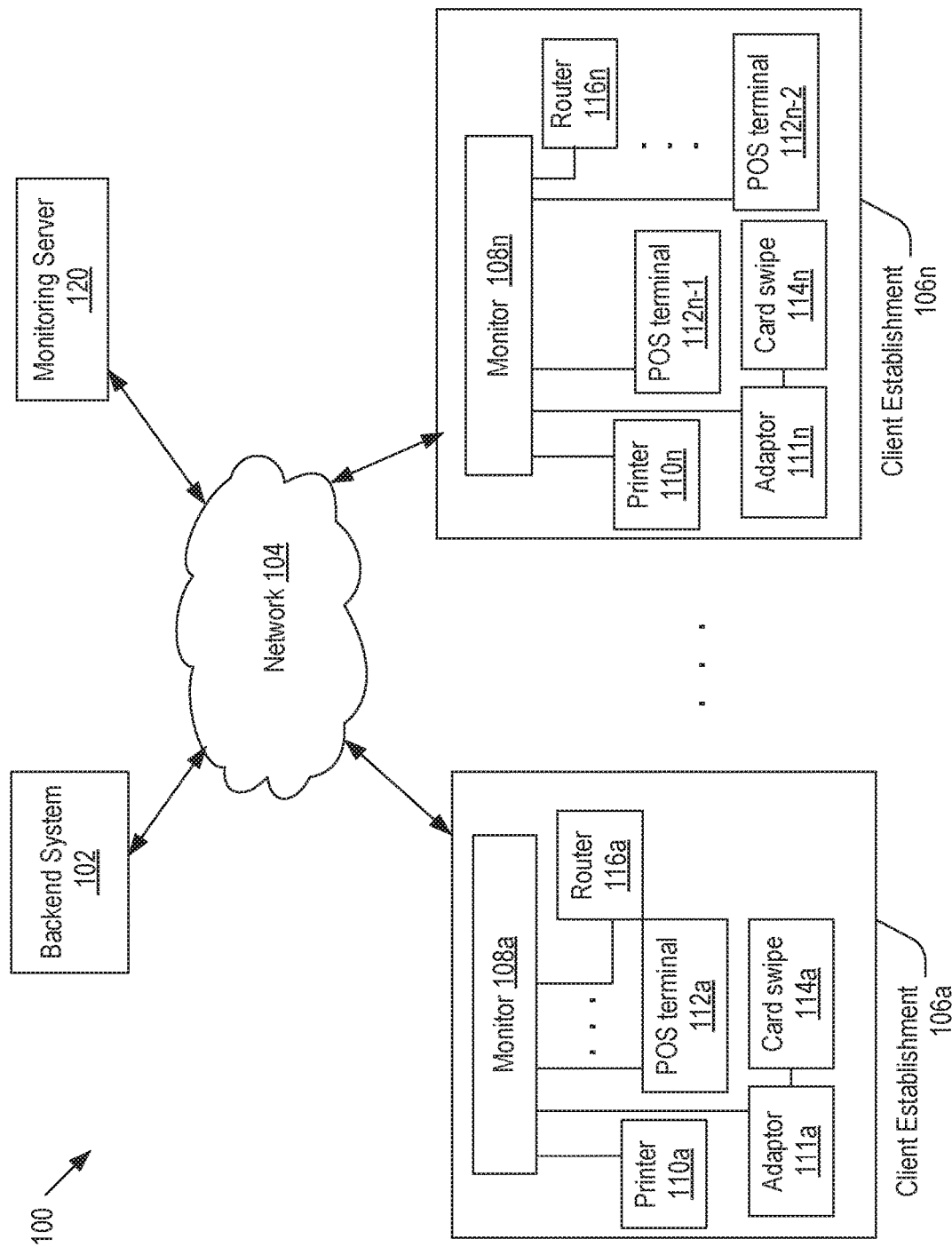
FIG. 1 shows a schematic diagram of a monitoring system according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components and nodes shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components or nodes may be implemented in software, hardware, or a combination thereof.

Furthermore, connections between components and nodes within the figures are not intended to be limited to direct connections. Rather, data between these components may be modified, re-formatted, or otherwise changed by intermediary components. Also, additional or fewer connections may be used. It shall also be noted that the terms "coupled" "connected" or "communicatively coupled" shall be understood to include direct connections, indirect connections through one or more intermediary devices, and wireless connections.

The terms "include," "including," "comprise," and "comprising" shall be understood to be open terms and any lists that follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

FIG. 1 shows a schematic diagram of a monitoring system 100 according to embodiments of the present disclosure. As depicted in FIG. 1, a backend system (or backend server, or, shortly, backend) 102, a monitoring server 120 and one or more client establishments 106a-106n may be connected to each other via a network 104, such as Internet. It is noted that the system 100 may include more than one backend system 102 and monitoring server 120.

The client establishment 106a may be a POS system and include: POS terminal 112a, such as tablet or computing device, that a salesperson may operate to complete transactions; a printer 110a for printing receipts and other documents; an adaptor, such as Ethernet adaptor, 111a coupled to a card swipe 114a for accepting card payments; and a router 116a coupled to the network 104. It is noted that the client establishment 106a may include other suitable components/devices for performing business transactions. Also, depending on the type of transaction requirements, the components in the client establishment 106a may be modified. In addition, the lines between the components in the client establishment 106a may represent communication channels, either wire/cable or wireless channel, between the components.

In embodiments, the client establishment 106a may include an operations monitor (or, shortly monitor) 108a that monitors/watches one or more devices and sends status information to the monitoring sever 120. In embodiments, the monitor 108a may be an inexpensive and small computer, such as Raspberry Pi computer developed by Raspberry Pi Foundation in Caldecote, United Kingdom. The monitor 108a may be a single board computer, enclosed in a case, that receives power and have one or more network connections. In embodiments, it may boot from a removable flash memory card, such as Micro SD card (such as those manufactured by SanDisk of Milpitas, Calif.), which contains an open source software based operating system and be preinstalled with monitoring software and associated plugins, and an array of custom scripts. The monitoring software may be an open source application, such as Nagios Core software (or shortly, Nagios) written by Ethan Galstad, that can monitor one or more devices in the client establishment 106a. For the purpose of illustration, it is assumed that the monitoring software includes Nagios in the following section of the present document, even though other software that may perform the same or similar functions may be employed.

In embodiments, the monitor 108a may be preconfigured, before shipping to the client, by a system administrator, where the pre-configuration may require information of the client's URL, a moniker identifying the client, and an establishment number identifying the location where the client establishment 106a is located. In embodiments, the monitor 108a may have three local user accounts with passwords known to an administrator. The first may be a general account for administration and troubleshooting of the monitor 108a itself. The second may be an account for running a configuration wizard, used by the backend system 102, to seed the monitor setup. The third may be an account used by a third-party support organization to perform troubleshooting of the client's establishment 106a and reconfiguration of the monitor 108a. In embodiments, the wizard may ask for the client's URL and establishment number, validate that the monitor 108a can contact the relevant backend system 102, write the configuration to the memory card in the monitor 108a, and download and install the most recent versions of configuration and binary bundles (352 in FIG. 3). Upon completion of the pre-configuration by the system administrator, the monitor 108a may be sent to the client so that the client may install the monitor 108a into the client establishment 106a.

To enroll in the monitoring system 100, each monitor (e.g., 108a) may be first assembled and configured. In embodiment, a printed circuit board, case, Micro SD card (preinstalled with the monitor image), power supply, and Ethernet cable may be compiled. The monitor 108a may be connected to the router 116a configured for a specific address (e.g., 192.168.22.5/24), and turned on. An administrator may login to the configure account of the monitor 108a, which runs the configuration wizard. After configuration is written on the monitor 108a, the monitor 108a may be turned off and shipped to the client. At the client site, the monitor 108a just needs to be plugged into the client establishment 106a and powered on.

Figure 2:
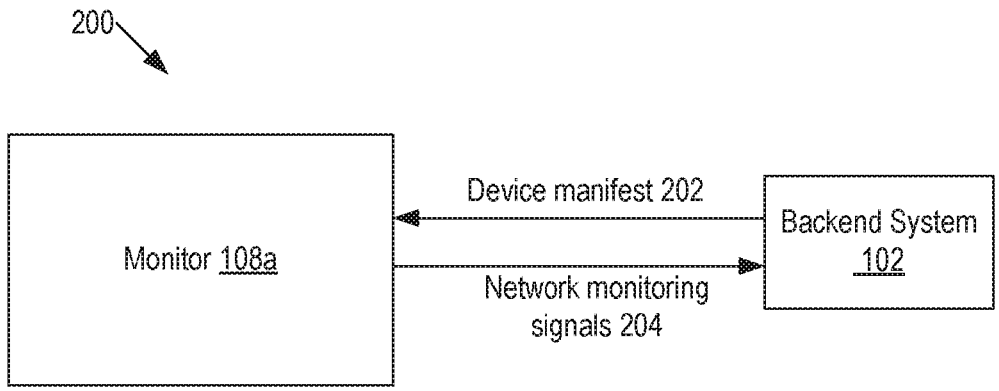
FIG. 2 shows a schematic diagram of communications between a monitor and a backend system according to embodiments of the present disclosure.

In embodiments, the monitoring server 120 may perform dark establishment detection. Nightly, the monitoring server 120 may query all backend systems 102 and receive the dates of last access (POS communicating with the backend system) and the most recently completed transaction, for all POS stations at all client establishments 106. A script on the monitoring server 120 may record the received information in a database, and then use the information to calculate which client establishments appear to be dark (completely stopped talking to the backend systems 102) or approaching darkness (still communicating with the backend system 102 but not sending transaction data). This information may be used by a Sales and Client Retention staff in an effort to reach out to one or more clients who have partially or completely stopped using the product. A POS application installed in a client establishment 106 may report to the monitoring server 120 (either directly or via the monitor 108 installed at the establishment 106) operational or transaction status. In embodiments, the reported status may include: tablet environmental and power condition (overheating, plugged in and charging, not plugged in and draining battery), number of queued payments not authorized, or any other information that relates to the POS's ability to facilitate business for the client. These metrics may be used to determine conditions like a payment gateway being offline, or a POS station is in danger of shutting down due to power or heat. In embodiments, the reported status may be presented on the portal (such as 406 in FIG. 4) for a staff, via the Activity Log (606 in FIG. 6) and Notification Generator (608 in FIG. 6). FIG. 2 shows a schematic diagram of communications between a monitor and a backend system according to embodiments of the present disclosure. In embodiments, a monitor (e.g., 108a) may host several custom scripts that run periodically to complete the configuration of the monitor. In embodiments, a custom script installed in the monitor 108a may send a request for device manifest information (shortly, device manifest) 202 to the backend system 102 on a regular basis, such as once per day. In response, the backend system 102 may send the device manifest 202 that includes a list of stations and peripherals installed in the client establishment 106a, along with their device types (such as barcode scanner, printer, so on) and IP addresses. In embodiments, the client establishment 106a may have some devices that use more than IP address (e.g., one for WiFi and one for Ethernet). In embodiments, these IP addresses may be used where the client establishment 106a is wired to Ethernet and use Wireless for backup. In cases where the client establishment 106a have two IP addresses, the backend system 102 and/or the monitor 108a may record these IP addresses and determine which is the primary (prioritizing wired over wireless, but choosing wireless if it's the only pingable address). This approach may allow the backend system 102 to determine whether the monitor 108a is "online" even if it drops off Ethernet but remains on wireless. In embodiments, a special check may alarm that the connection method has changed (signaling that a cable was unplugged, for example), while the regular ping check may remain green (OK) in this scenario.

Using the device manifest 202, the monitor 108a may programmatically configure the monitoring software (e.g., Nagios), which monitors all of the devices installed at the client establishment 106a. (Hereinafter, the term monitoring software and Nagios are used interchangeably, even though a software that has the same or similar functions as Nagios may be used in place of Nagios.) In embodiments, a collection of custom Nagios check scripts may be used to detect the status of the one or more devices in the client establishment 106a, where the scripts may detect more than just an online/offline condition. For example, an error condition that the Nagios may detect can be that the printer 116a is running low on paper, or a serial-to-Ethernet converter is not being able to detect a card swipe that must be plugged in.

In embodiments, aside from POS related status, the monitor (e.g., 108a) may perform basic networking checks, including domain name server (DNS) response time and network latency. In embodiments, the monitor 108a may include a script to read the router's configuration to determine the default route at the client Internet service provider (ISP). In embodiments, as depicted in FIG. 2, the monitor 108a may send network monitoring signals 204, such as ping signals and HTTP protocol requests, to the backend system 102 and measure the response time, as a gauge of general latency to the backend system 102.

In embodiments, the client establishment 106n may have a new device installed therein or a device removed therefrom. In such a case, the backend system 102 may generate a new device manifest 202 and send it to the monitor 108n when the monitor 108n sends a request for the device manifest to the backend system 102. The monitor 180n then reconfigures the monitoring software 336 to adapt to the new information in the manifest.

In embodiments, the monitor 108a, with the help of off-the-shelf open source components and custom scripts, may provide an on-the-ground view of the POS system at the client site and replay it to the monitoring server 120.

In embodiments, one or more sensor devices that each include a sensor, such as thermometer, may be included in the client establishment 106a. According to a schedule, each sensor device may take a reading from the sensor, and broadcast the results over radio. In embodiments, the client establishment 106a may also include a second device which receives the readings from the sensor devices and communicate the readings through a serial interface over USB. In embodiments, the sensor devices and the second device may be used for environmental monitoring at the client establishment 106a. For instance, the sensor devices may read the temperatures of refrigerators/freezers where the wrong temperature can cause product spoilage.

In embodiments, these sensor devices may be used generically as an Internet of Things (IoT) interface; the sensor devices can be small, low-power devices and read or assess one or more metrics or quantities, such as image data, temperature, humidity, sound levels, and light levels. In embodiments, the sensor devices may use infrared, computer vision, or other technologies to monitor the client establishment 106a. In embodiments, the sensor devices may be read via scripts, and their status may be relayed into Nagios by the monitor 108a, and then follow the same flow as all other monitoring data.

Figure 3:
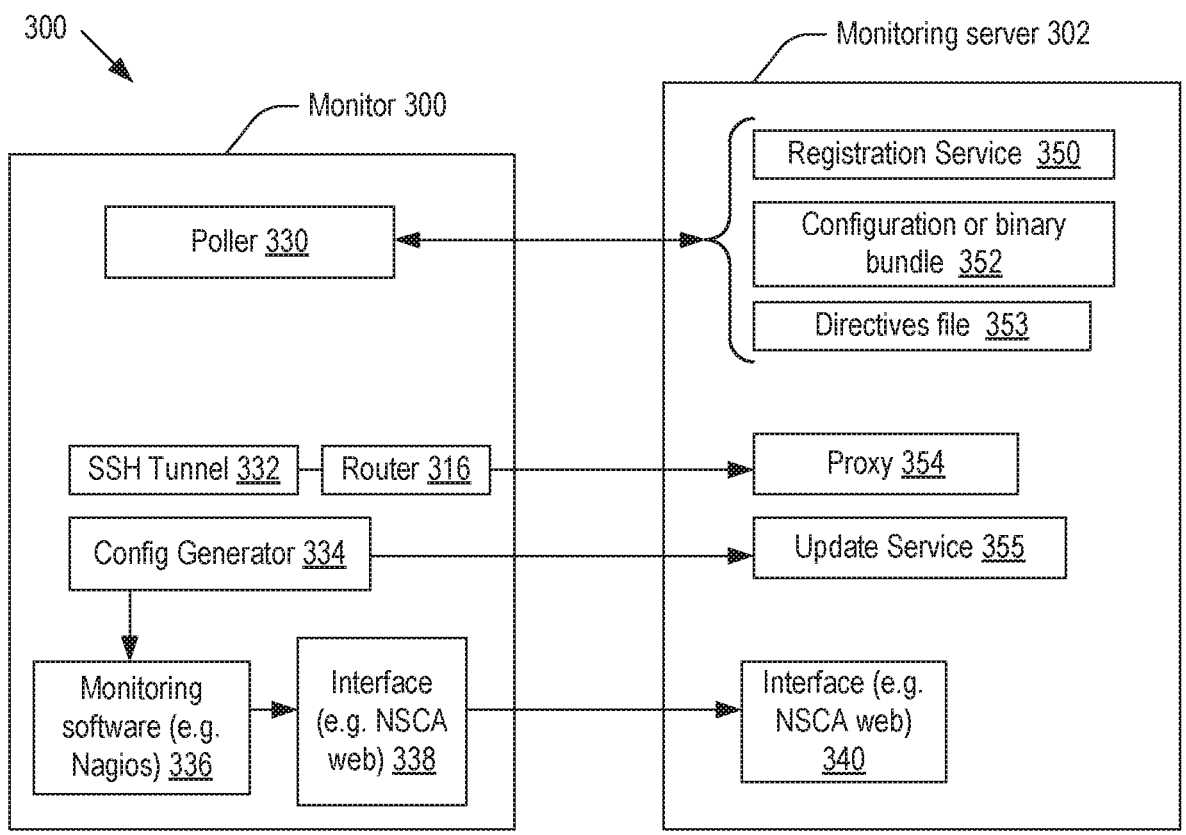
FIG. 3 shows a schematic diagram of communications between a monitor and a monitoring server according to embodiments of the present disclosure.

FIG. 3 shows a schematic diagram of communications between a monitor 300 and a monitoring server 302 according to embodiments of the present disclosure. As depicted, the monitor 300, which may be the same as or similar to the monitors 108 in FIG. 1, and the monitoring server 302, which may be the same as or similar to the monitoring server 120 in FIG. 1, form a two-part system for monitoring the devices in the client establishments 106. The monitor 300 actively monitors/watches the client sites and reports the monitored status to the monitoring server 302 and the administrator accesses the monitoring server 302 to analyze, search, and review the status so that the client's business can run smoothly.

As depicted in FIG. 3, the monitor 300 may include a poller script (or, shortly poller) 330, that checks in with the monitoring server 302 on a regular basis, such as every five minutes, according to a schedule. If the monitoring server 302 has not acknowledged the monitor 300 before, a new configuration for registration of the monitor 300 may be generated and a randomly generated password to be used by the monitor 300 may be returned to the monitor 300. If the monitoring server 302 has acknowledged the monitor 300 before, the latest configuration for registration of the monitor is sent to the monitor 300.

In embodiments, the monitoring server 302 may include a registration service 350 that may track all client establishments 106, assign a unique identifier and a randomly generated password used for encryption to each client establishment. In embodiments, the registration service 302 may also assign an internal moniker for each client, called a "simple name," which is used to name client-side devices and monitoring aggregation objects (which may include Open Monitoring Distribution (OMD), Check_MK, and Nagios software objects, as described in conjunction with FIG. 4). The last IP address that the monitor 300 checked in from may be recorded by the registration service 302.

If the monitor 300 fails or is damaged, it can be replaced by a new monitor that has been configured in like manner as the original monitor is configured before shipping. In embodiments, the replacement monitor 300 may inherit the prior monitor's configuration from the registration service 350.

In embodiments, the poller 330 may check if the server has any new configuration or binary bundles 352. If so, the new configuration or binary bundles 352 may be downloaded and unbundled by the poller 330. This mechanism may be used to distribute new versions of scripts to the monitor 300. In embodiments, these scripts may contain instructions to install software which may add new capabilities to the monitor 300. In embodiments, the scripts may install new packages via the Internet and/or contained in the binary bundle. 352

In embodiment, the monitor 300 may include configuration generator 334 that configures the monitoring software (e.g., Nagios) 336, based on the device manifest 202 and the configuration or binary bundles 352. Once the Nagios configuration is written on the monitor 300, the monitor 300 may send a device summary to the monitoring server 302 via a special call to an update service 355. In embodiments, more specifically, when the Nagios configuration is written on the monitor 300, the device summary is sent to a special service on the monitoring server 302 that uses Check_MK (403 in FIG. 4) to configure the corresponding monitoring software (e.g., Nagios) instance (405 in FIG. 4). In embodiments, the monitoring server 302 may include an interface (e.g., NSCA web) 340 that communicates data from the interface (e.g., NSCA web) 338 installed in the monitor 300 to the corresponding monitoring replica 401. Once the Nagios is configured on the monitor 300, it begins monitoring the devices at the client establishment and relays the information via NSCA web (as indicated by the arrows between 336, 338, 340, and 401).

In embodiments, the monitor 300 may provide configuration information (which may include the Ethernet MAC address, a serial number identifying the last configuration bundle 352 installed, and public SSH key used to establish SSH tunnels) in conjunction with the device summary to the monitor server 302. This information is recorded in the database and used for system troubleshooting. For example, this information may be used to determine the last configuration bundle successfully loaded onto a device; and, it may be used to load the same configuration bundle unto a replacement device, if required.

Figure 4:
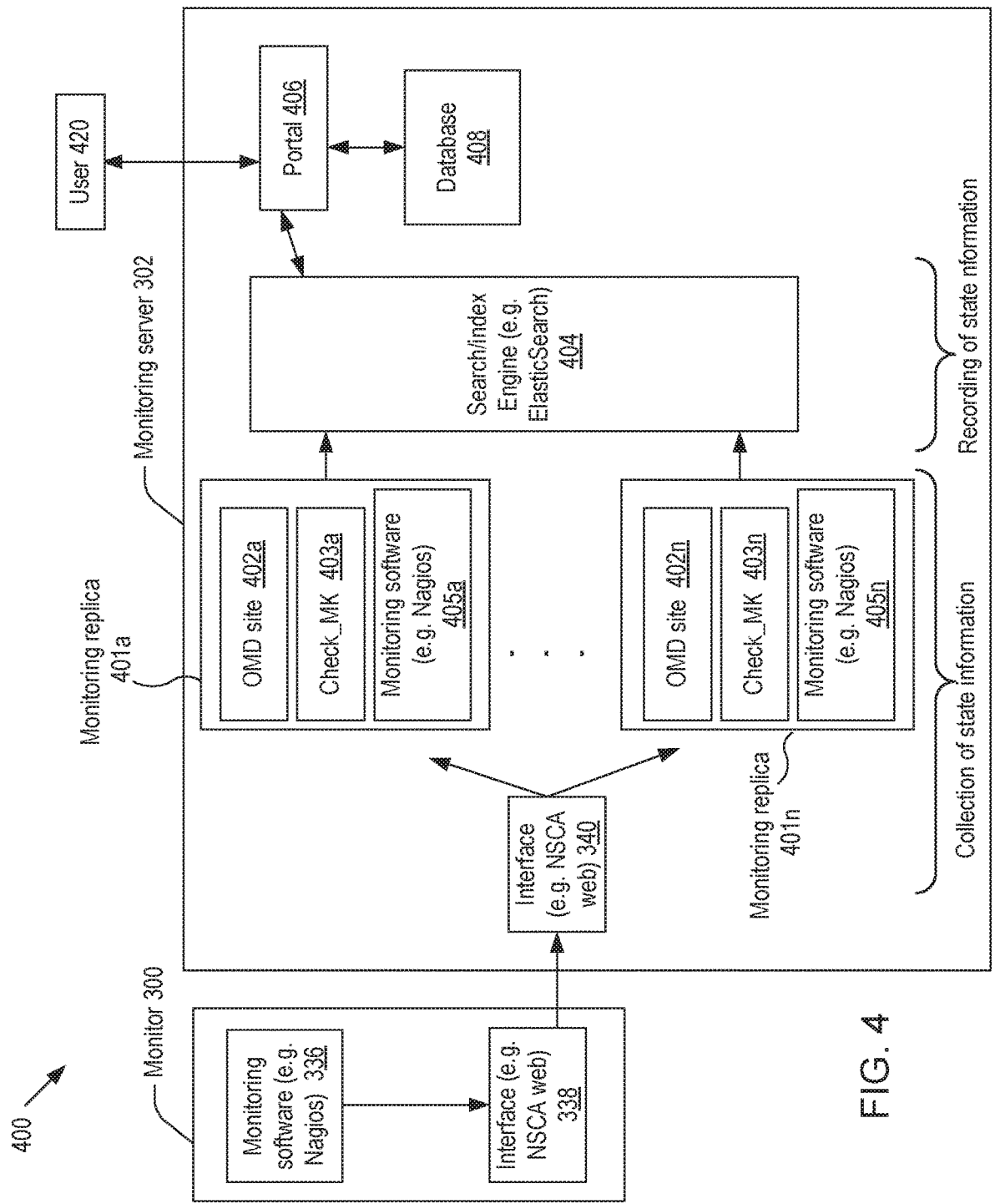
FIG. 4 shows a schematic diagram of monitoring communications between a monitor and a monitoring server according to embodiments of the present disclosure.

In embodiments, the monitoring server 302 may provide the monitoring service based on Open Monitoring Distribution (OMD) that combines Nagios and Check_MK software objects (shortly, Check_MK) to create a multi-tenant system. (In embodiments, Check_MK is an extension to the Nagios monitoring system that allows creating rule-based configuration.) FIG. 4 shows a schematic diagram 400 of monitoring communications between the monitor 300 and the monitoring server 302 according to embodiments of the present disclosure. In embodiments, when the monitoring server 302 receives the device summary from the monitor 300 via the update service 355, it replicates the Nagios configuration into the monitoring server 302. In embodiments, the monitoring server 302 may create a monitoring replica 401 for each client URL, where each monitoring replica 401 may include an OMD site 402, monitoring software (e.g., Nagios) instance 405, and Check_MK objects 403 and represent the devices at each client establishment 106. For instance, the OMD site 402a, monitoring software (e.g., Nagios) 405a, and Check_MK 403a of the monitoring replica 401a may correspond to the client establishment 106a.

In embodiments, the state of Check_MK objects 403 may be populated when the monitor 300 pushes the monitored status information via the interfaces (e.g., NSCA web applications) 338 and 340. In embodiments, the monitoring server 302 may collect state information across all client establishments 106 contained in the OMD sites 402 on a regular basis according to a schedule, such as every two minutes, and index the status in a suitable search/index engine (e.g., ElasticSearch software or shortly Elastic-Search), for presentation and analysis by an administrator. It is noted that other search/index engines may be the same as or similar to ElasticSearch may be used in place of Elastic-Search. In embodiments, search/index engine (e.g., Elastic-Search) 404 may store long term history of the client establishments 106 and operate as a backup storage as well.

In embodiments, the database 408 may store registration record generated by the registration service 350. In embodiments, the database 408 may include MySQL database management system. The database 408 may store rules and user preferences that the portal 406 may use when the portal 406 presents information to the user 420.

In embodiments, the monitoring software (e.g., Nagios) 336 may relay the monitored status information of the host client establishment 106 to the monitoring server 302 via the interfaces (e.g., NSCA web applications) 338 and 340. In embodiments, the monitoring software 336 may be an open source package and used to relay the status information to the monitoring server 302, especially where the monitoring server 302 cannot access the client establishment 106 due to network topology or fire walls installed in the client establishment 106. In embodiments, the relaying of the status information by NSCA may be encrypted using a random password, where the password may be generated by the registration service 350.

In embodiments, the portal 406 may be coupled to the search/index engine 404 and act as the presentation layer to the data collected and stored in the search/index engine 404. In embodiments, the portal 406 may be the only completely custom component in the client establishment 106. In embodiments, the portal 406 may be served via a web server software (e.g., Apache web server software) and comprises an open source framework (e.g., Flask framework), and custom modules (e.g., Python modules) to interface with the database 408, secure shell (SSH) tunnel service and data stored in the search/index engine 404. In embodiments, the database 408 may include registration data.

In embodiments, the user 420 may access the portal 406 using their web browser. In embodiments, upon login, the portal 406 may authenticate the user via a login and password combination previously recorded in the database, or via Google Applications service, requiring a predetermined suffix (e.g., @revelsystems.com) to their email address. In embodiments, an authorized user may log into the portal 406. Access to the portal 406 may be further restricted by an IP address, using a host-based firewall on the monitoring server 302. Allowed IPs may include the office networks of a company such that a staff of the company on the office network may access the portal 406. The user 420 may be either unprivileged (allowed a read-only view to data) or privileged (additionally allowed to manipulate SSH tunnels). Additionally, the user 420 may have access only to certain monitors and their associated data.

Figure 9:
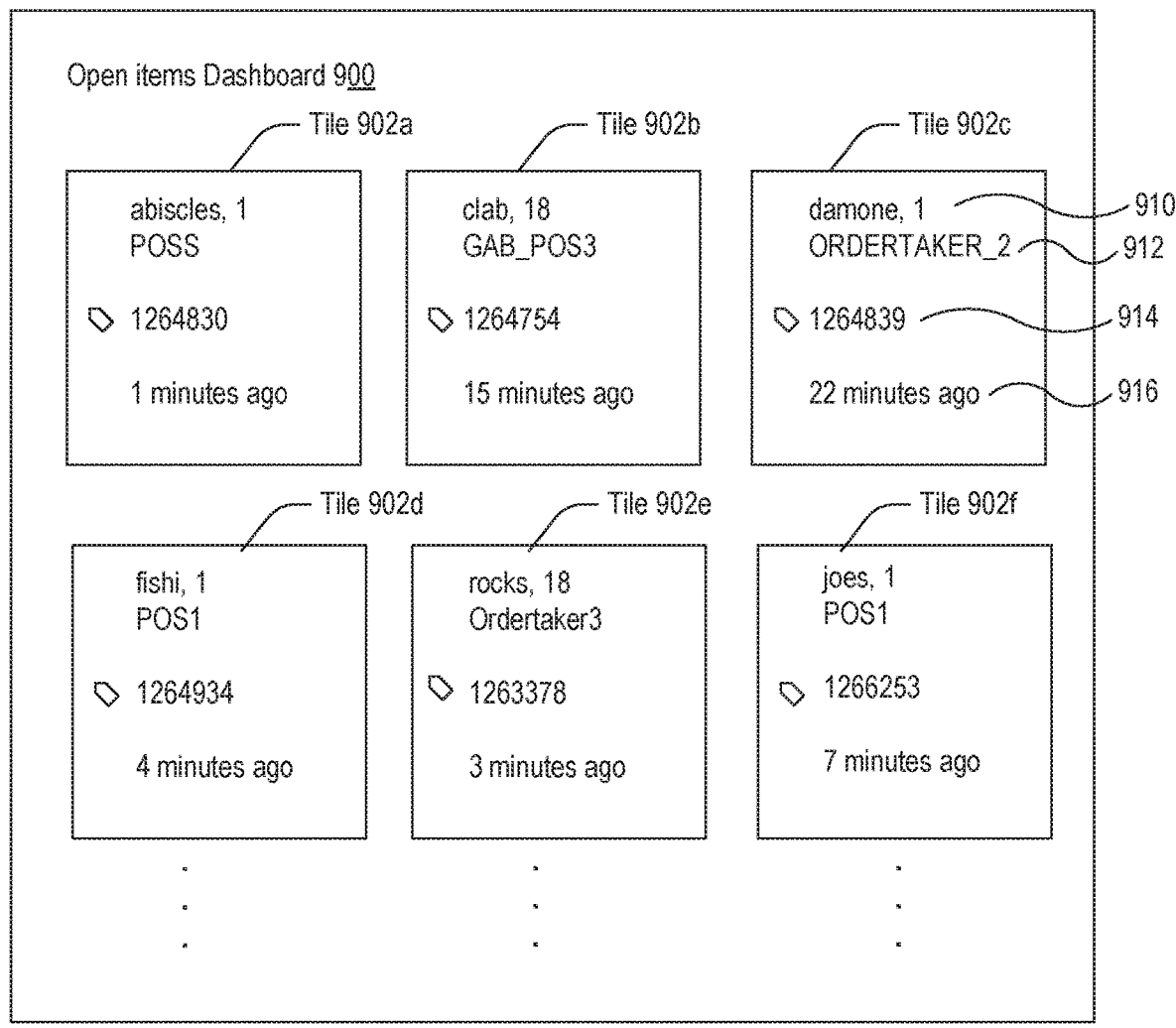
FIG. 9 shows an exemplary Open items page according to embodiments of the present disclosure.

In embodiments, upon logged in, the user may be presented with a series of dashboards and data browsing interfaces. Dashboards may include simplified view of data, for quick consumption. The main purpose of dashboards is to give a quick at-a-glance view of problems to address at client establishments 106. In embodiments, a monitor dashboard may show a summary view of establishments 106 with detected problems, collated by client URL. FIG. 9 shows an exemplary Open items dashboard according to embodiments of the present disclosure. As depicted, the Open items dashboard 900 may present a tiled view of monitored objects in an alarm state (such as a POS terminal being offline) and corresponding ticket numbers. In embodiments, each tile (e.g., 902c) may include a client URL and an establishment number 910 (e.g., damone, 1), a name of monitored object 912 (e.g., ORDERTAKER_2), a ticket number 914 (e.g., 1264839) and a time 916 indicating how long ago the open item was created (e.g., 22 minutes). In embodiments, the Open items dashboard 900 may be a depiction of one or more detected alerts and presented in a quick glance view for a support team.

In embodiments, a System health dashboard (not shown in the figures) may be used to show the operational state information of the monitoring server 302, where the operational state information includes a tally of the number of URLs, establishments, and monitored objects indexed in the monitoring server 302. System health dashboard may also show how long ago the last indexed state was recorded, to indicate whether information is flowing in the monitoring server 302 or not.

In embodiments, the portal 406 may allow the user 420 to browse the data "Checks" that relate to monitored devices and are organized by client URL an establishment number. The portal 406 may present the Checks data in a table that includes a list of client establishments and their registration and poller status, and SSH tunnel status. In embodiments, the user 420 may request that the SSH tunnel be started or stopped from this page.

In embodiments, the user 420 may only be able to view information (including monitor registration, monitoring status, and activity logs) from certain client establishments, as granted by systems administrators. FIG. 10 shows an exemplary user permissions page 1000 according to embodiments of the present disclosure. As depicted, the user permissions page 1000 may include an Account information section that allows a system administrator to enter the user's login information into the text fields 1002, select one or more of the switches 1004, and press the Submit button 1006 to record any changes. In embodiments, the table enumerating devices visible to user 1010 determines the scope of user access to the data stored in the database 408 and search/index engine 404.

In embodiments, the user permissions page 1000 allows a system administrator to manage user accounts on the portal 406 and permissions that together, may facilitate third-party support organizations to view information and remotely access (for the purpose of troubleshooting) only client establishments for which they are a source of support. For example, support staff at a reseller may be a first support contact for clients they sell a POS system to, including this monitoring system. In embodiments, system administrators may create user accounts on the portal 406 that grant access to this information by support staff employed by the reseller or by a client's own support staff (e.g., a company's IT department).

Referring back to FIG. 3, in embodiments, the poller 330 may check if an SSH channel 332 is requested by the monitoring server 302, where the SSH channel 332 is used to facilitate remote access into the monitor 300 by an administrator. If requested, the monitor 300 may make an outbound SSH connection via the router 316, which may be the same as or similar to the router 116a in FIG. 1, to the proxy 354 in the monitoring server 302 and maintain an open SSH channel. The SSH channel allows an administrator to login to the monitor 300 from the monitoring server 302, to be able to diagnose trouble with the monitor 300 or otherwise perform diagnostic work on the network at the client establishment 106. In embodiments, the monitoring server 302 may authorize the SSH channel request using the stored public SSH key previously sent to it as part of the configuration information sent with the device summary.

In embodiments, the administrator may log into the monitor 300, even if the monitor 300 is not directly accessible over the network 104. In embodiments, the client establishment 106 may include a wired router 316 that is configured to allow one or more outbound connections but block any incoming connections. This feature allows the client establishment 106 to communicate with payment gateways and the backend system 102 while protecting the client establishment 106 against unwanted traffic.

In embodiments, the SSH tunnel 332 may only be initiated from behind the router 316 and the monitor 300 must poll the monitoring server 302 to determine if remote access is needed. In embodiments, the user 420 may indicate a request for the SSH tunnel on the monitoring server 302 by sending the request via the portal 406 (in FIG. 4). The next time the monitor 300 checks in with the monitoring server 302, if the SSH tunnel is requested, the monitor 300 may initiate the SSH tunnel 332 to the monitoring server 302. Once the SSH tunnel 332 is open and active, the portal 406 may notify the user 420 of the active SSH tunnel.

In embodiments, the monitoring server 302 may include a directive file 353, which may be a text file. The directives file 353 may be downloaded to the monitor 300 and interpreted by the poller 330. The directive file 353 may contain variables that include the connection request indicated by the user 420. For example, the directives file 353 for a particular monitor may contain the text, "sshtunnel=yes". Upon reading the text, the poller 330 may initiate the SSH tunnel 332.

In embodiments, the portal 406 may include "SSH tunnel" page that allow the user 420 to request the SSH tunnel 332. FIG. 5 shows an exemplary SSH tunnel page 500 according to embodiments of the present disclosure. As depicted, the SSH tunnel page may include one or more columns; name 502 of client establishments, endpoint 504 that indicates the monitoring server and TCP port number, last contacted 506 that indicates the last time when the monitor 300 contacted the monitoring server 302, requested 508 that indicates whether SSH tunnel was requested, status 510 that indicates whether the SSH tunnel is open, and actions 512 that allows the user to initiate the SSH tunnel. The user 420 may request the SSH tunnel by clicking on the toggle link under the actions column 512 on the SSH tunnel page 500. When the user 420 first requests a tunnel to be opened, the corresponding line on the page 500 may change its color. In embodiments, a TCP port may be dynamically allocated to the tunnel, and indicated on that one in the endpoint column 504. When the connection is made and detected by the monitoring server 302, that line may change its color to indicate that the SSH tunnel is open and ready for user.

In embodiments, the SSH tunnel 332 may be initiated by the monitor 300. When the monitor 300 checks with the registration service 350 and the tunnel request flag is on, the monitor 300 may initiate the tunnel using a shell script. In embodiments, the endpoint 504 on the page 500 is contained in the registration record that the monitor 300 receives from the monitoring server 302 and is used by the shell script to determine where to initiate the SSH tunnel 332.

In embodiments, two or more ports may be opened on the monitoring server 302 side of the tunnel: one for login access to the monitoring sever 302 and another for accessing a web proxy server 354 running on the monitoring server 302. The former port may allow the user 420 to login to the monitor 300 over the SSH tunnel, for troubleshooting and diagnostic work. The latter may allow the user 420 to connect to and interact with web interfaces at the client establishment 106. For example, the user 420 may want to browse the web interface on a printer 110a to verify its configuration or perform a test.

In embodiments, if the monitor 300 has an established tunnel open, and the registration record shows it is not requested, the monitor 300 closes the tunnel. The monitoring server 302 may periodically (e.g., every ten minutes) examine reserved port numbers for tunnels, and disconnected ports may be reclaimed so that they may be used again in the future while the number of reserved ports required is kept to a minimum.

Figure 6:
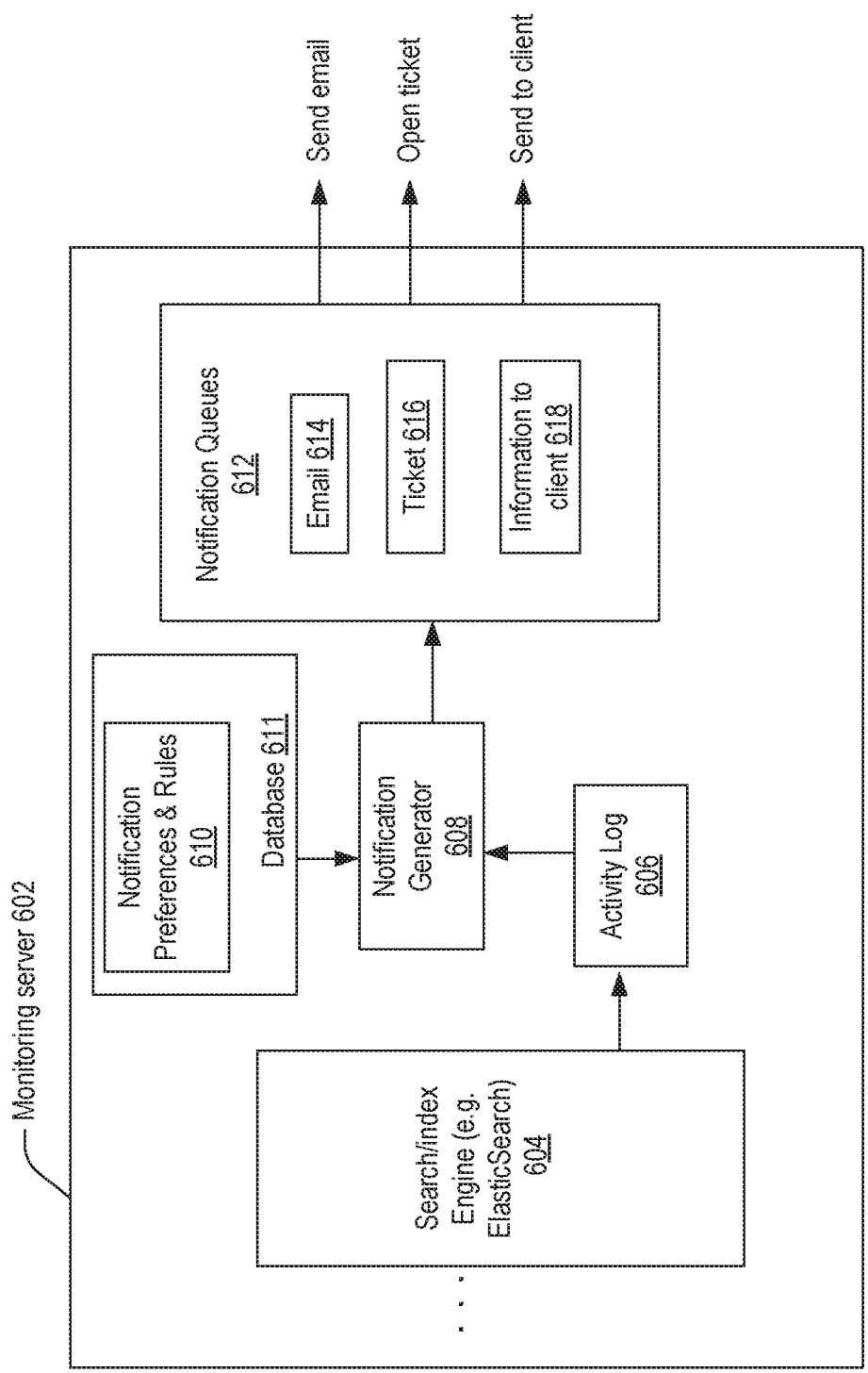
FIG. 6 shows a schematic diagram of a monitoring server according to embodiments of the present disclosure.

FIG. 6 shows a schematic diagram of a monitoring server 602 according to embodiments of the present disclosure. In embodiments, the monitoring server 602, which may be the same as or similar to the monitoring server 120 in FIG. 1, may index and store the data passed from OMD sites (402 in FIG. 4). The activity log 606 may read the indexed state information stored in the search/index engine (e.g., ElasticSearch) 604. In embodiments, the activity log 606 may read the two most recent statuses recorded for each monitored object, generate an activity log which describes any status changes and pass the information to the notification generator 608. For instance, POS terminal 112*n*-2 dropped off the network from Joe's Snack Shack 106*n*. In embodiments, each entry in the log may include URL, establishment number, object name, and a message.

In embodiments, the monitoring server 602 may also include a database 611, which may be the same as or similar to the database 408 in FIG. 4 and store the notification preferences & rules 610. In embodiments, the rule may indicate which notifications are delivered to whom and facilitate the enterprise account managers to be notified of changes at the client establishments 106 that they support. In embodiments, the notification generator 608 may store the notification preferences & rules 610 into the database 611.

The notification generator 608 may receive the activity log information from the activity log 606, receive the notification and preferences & rules from the database 611 and send various types of notifications to the notification queues 612. The notification queues 612 may send the notifications, such as an email 614, open a support ticket 616 on behalf of the client, and send information 618 directly to the client via some management interface.

Figure 11:
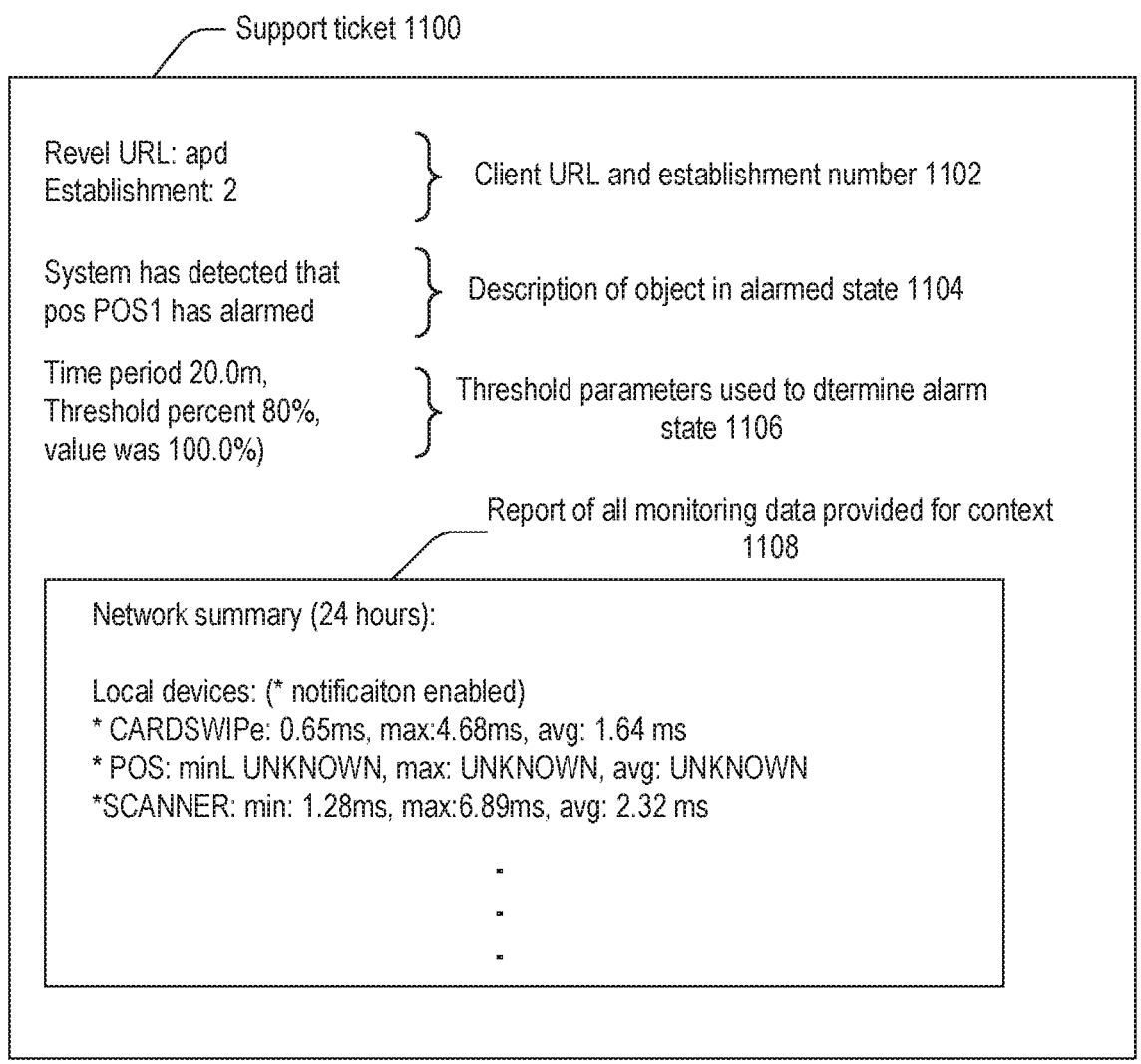
FIG. 11 shows an exemplary support ticket according to embodiments of the present disclosure.

FIG. 11 shows an exemplary support ticket 1100 according to the present disclosure. In embodiments, the support ticket 1100, which may be the same as or similar to the support ticket 616 and 914, may contain information such as the client URL and establishment number 1102, the name of the object in an alarmed state 1104, the parameters used to determine the alarm state 1106, and a report of all monitoring data from the client establishment provided for context 1108. The support ticket 1100 may also be encoded with the type of device to facilitate automated ticket routing to the appropriate support team. For example, one support team may primarily assist with payment terminals, while another team may assist primarily with POS stations.

Figure 7:
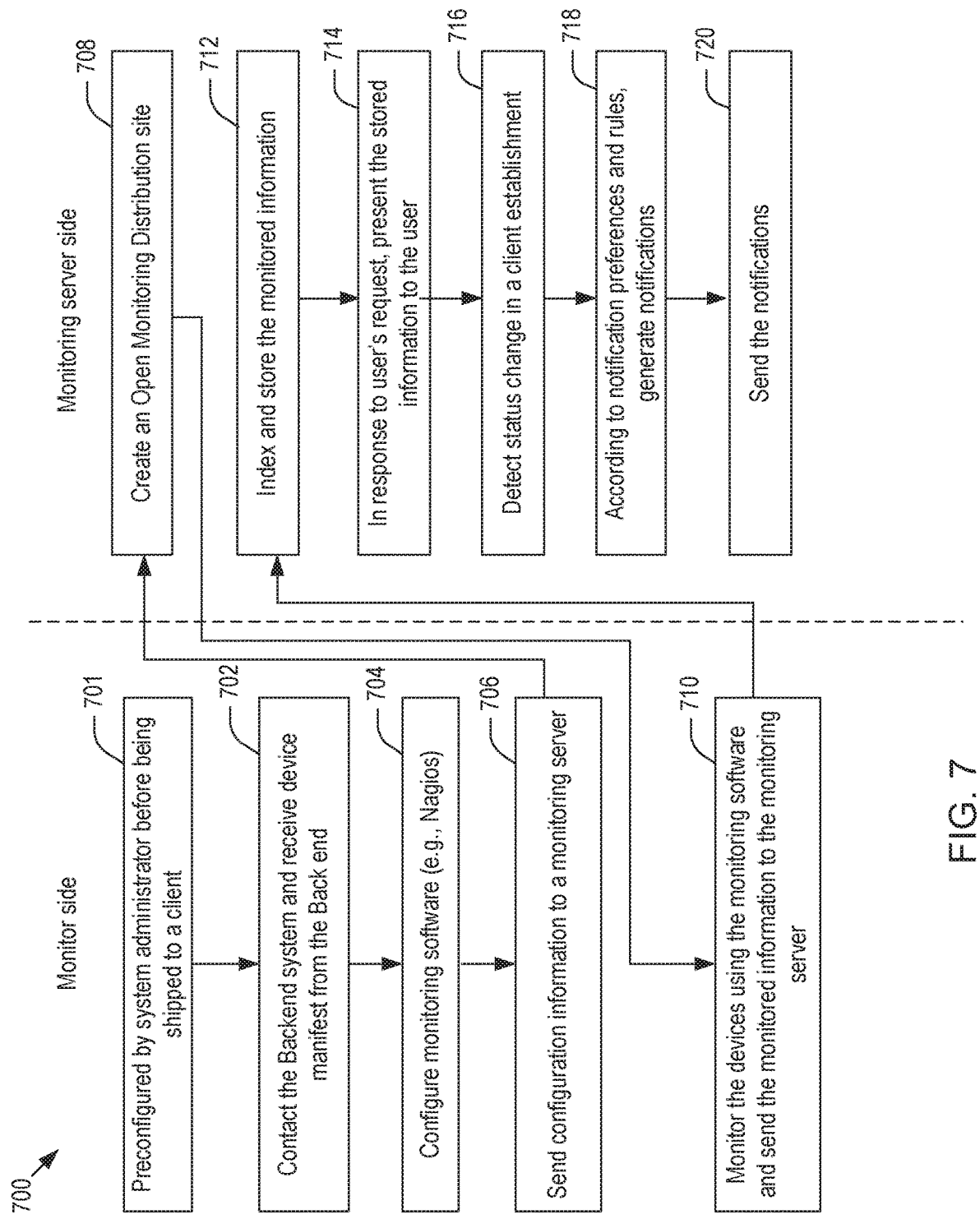
FIG. 7 shows a flowchart of an illustrative process for monitoring status of a POS system according to embodiments of the present disclosure.

FIG. 7 shows a flowchart 700 of an illustrative process for monitoring status of a POS system according to embodiments of the present disclosure. At step 701, the monitor 108 may be preconfigured using the backend system 102 before being shipped to the client. In embodiments, the monitor 108 may be shipped along with other equipment in the client establishment. At step 702, the monitor 108 may be installed in the client establishment 106, contact the backend system 102 to send a request for device manifest 202 and receive the device manifest from the backend system 102.

At step 704, the monitor 108 may configure the monitoring software (e.g., Nagios) using the device manifest 202. Then, the monitor 108 may send the configuration information of the monitoring software to the monitoring server 120 at step 706. At step 708, the monitoring server 120 may create an OMD site 402 and Check_MK objects for the monitor 108. Then, the process proceeds to step 710.

At step 710, the monitor 108 may monitor one or more devices in the client establishment 106 where the monitor is installed, using the monitoring software and send the monitored information to the monitoring server 120. In embodiments, the monitor 108 may push the monitored information into the monitoring replica 401, which includes the OMD site 402 and Check_MK objects 403, in the monitoring server 120. Then, at step 712, the monitoring server may index and store the monitored information using the search/index engine 404.

At step 714, in response to the user's request, the monitoring server 120 may present the information stored in the search/index engine 404 to the user 420. In embodiments, the portal 406 may present the information in accordance with the rules stored in the database 408.

At step 716, the monitoring server 120 may detect status change in the client establishment 106. In embodiments, the activity log 606 may read the indexed state information stored in the search/index engine 604. In embodiments, the activity log 606 may read the two most recent statuses recorded for each monitored objects and generate an activity log, where the activity log may include information of the status change.

At step 718, the monitoring server 120 may generate notifications. In embodiments, active log 606 may pass the activity log to the notification generator 608, which in turn generates notification according to the notification preferences and rules 610. Then, at step 720, the notifications are sent to corresponding recipients.

In embodiments, the directives file 353 for a particular monitor may contain the text, "runonce=YYYYMMDDHHMM_rebuild", where YYYYMMDDHHMM represents the current time, signifying the year, month, date, and minutes. Upon reading the text, the poller 330 may immediately begin a reconfiguration task, as depicted as flowchart 700 in FIG. 7, starting at step 702. This may be used to correct configuration errors in the monitoring software in either the monitoring software 336 on the monitor 300 or its corresponding monitoring software (e.g. Nagios) instance 405.

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present invention may be implemented in any instruction-execution/computing device or system capable of processing data, including, without limitation phones, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 8:
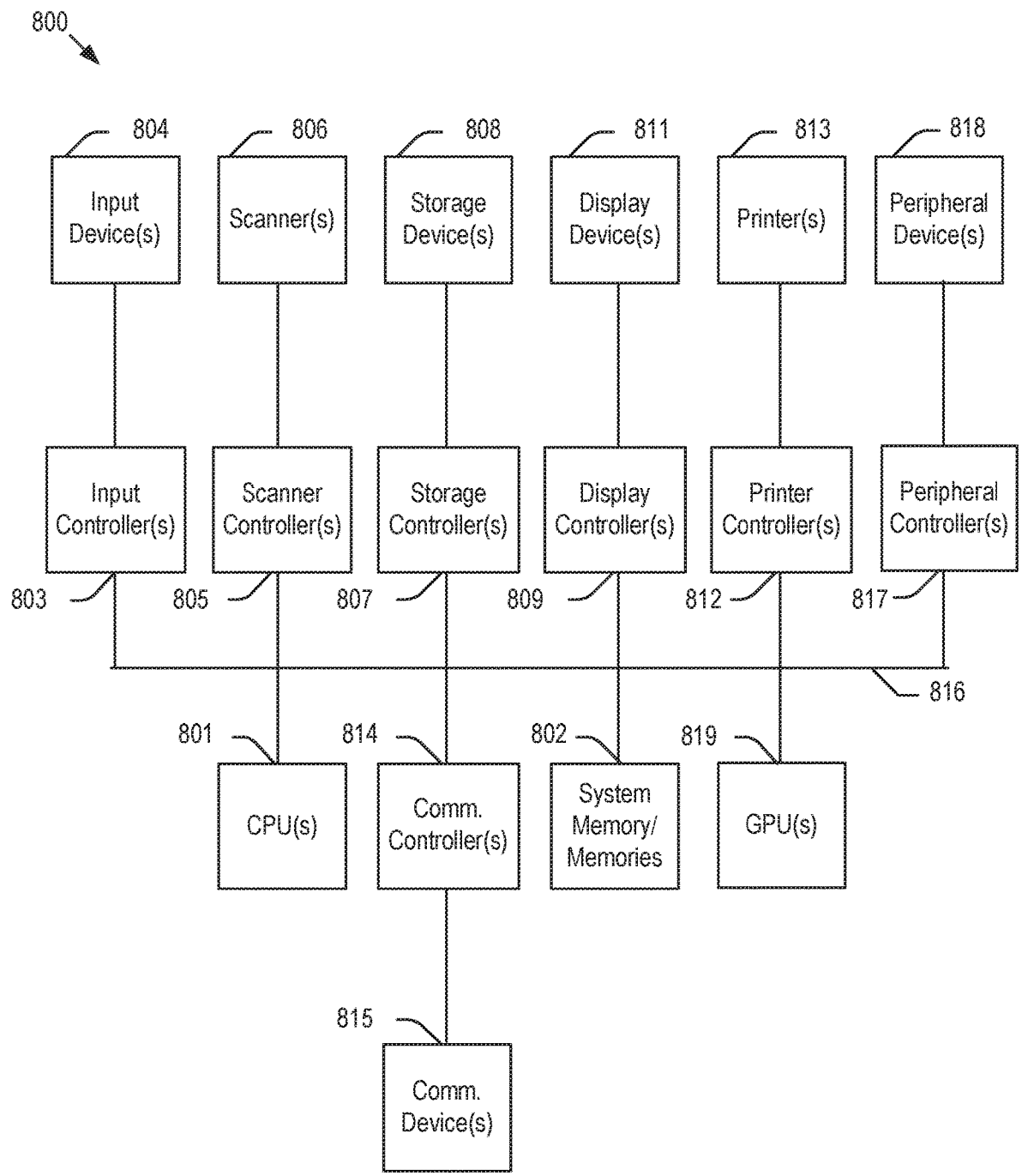
FIG. 8 shows a computer system according to embodiments of the present disclosure.

Having described the details of the invention, an exemplary system 800, which may be used to implement one or more aspects of the present invention, will now be described with reference to FIG. 8. Each device in FIGS. 1-6 may include one or more components in the system 800. As illustrated in FIG. 8, system 800 includes a central processing unit (CPU) 801 that provides computing resources and controls the computer. CPU 801 may be implemented with a microprocessor or the like, and may also include a graphics processor 819 and/or a floating-point coprocessor for mathematical computations. System 800 may also include a system memory 802, which may be in the form of random-access memory (RAM) and read-only memory (ROM).

A number of controllers and peripheral devices may also be provided, as shown in FIG. 8. For example, the system 800 may also a number of different peripherals 818, which may be or may include one or more sensors or other monitoring-related devices, and may include any associated controllers 817. An input controller 803 represents an interface to various input device(s) 804, such as a keyboard, mouse, or stylus. There may also be a scanner controller 805, which communicates with a scanner 806. System 800 may also include one or more storage controllers 807 for interfacing with one or more storage devices 808 each of which includes a storage medium such as magnetic tape or disk, or an optical medium that might be used to record programs of instructions for operating systems, utilities and applications which may include embodiments of programs that implement various aspects of the present invention. Storage device(s) 808 may also be used to store processed data or data to be processed in accordance with the invention. System 800 may also include a display controller 809 for providing an interface to a display device 811, which may be a cathode ray tube (CRT), a thin film transistor (TFT) display, or other type of display. System 800 may also include a printer controller 812 for communicating with a printer 813. A communications controller or controllers 814 may interface with one or more communication devices 815, which enables system 800 to connect to remote devices through any of a variety of networks including the Internet, an Ethernet cloud, a Fiber Channel over Ethernet (FCoE)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (e.g., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

It shall be noted that elements of the claims, below, may be arranged differently including having multiple dependencies, configurations, and combinations. For example, in embodiments, the subject matter of various claims may be combined with other claims.

What is claimed is:

1. A monitoring device installed in a point-of-sales (POS) establishment to monitor status of the POS establishment via a network and performing the steps comprising:
   sending a request for a device manifest that includes information of one or more devices preconfigured for installation at a POS establishment to a backend server via a network, the monitoring device is preconfigured prior to being installed in the POS establishment;
   receiving, in response to the request, the device manifest from the backend server via the network;
   configuring, using the received device manifest, a monitoring software that monitors status of the one or more devices;

sending information of the configured monitoring software to a monitoring server via the network;

causing the monitoring software to collect status information of the one or more devices;

sending the collected status information to the monitoring server via the network;

sending, via a poller script of the monitoring device, a check-in signal to the monitoring server on a regular basis via the network;

receiving information that includes at least one of a new configuration and a binary bundle from the monitoring server via the network;

downloading and unbundling, via the poller script, the received information to the monitoring device; and adjusting a configuration of the monitoring software based on the unbundled information thereby adding new capabilities to the monitoring device.

2. The monitoring device as recited in claim 1, wherein the steps further comprise:

repeating the steps of sending a request for a device request and receiving the device manifest on a regular basis; and adjusting a configuration of the monitoring software based on a change in the device manifest.

3. The monitoring device as recited in claim 1, wherein the steps further comprise:

receiving a request for a secured communication channel from the monitoring server; and establishing the secured communication channel between the monitoring device and the monitoring server.

4. The monitoring device as recited in claim 1, wherein the steps further comprise, prior to the step of sending the collected status information:

receiving a password from the monitoring server; and encrypting collected status information with the password.

5. The monitoring device as recited in claim 1, wherein the device manifest includes information of type and IP address of each of the one or more devices.

6. The monitoring device as recited in claim 1, wherein the monitoring device sends a ping signal to the backend server and times the response time to the backend server to thereby gauge latency to the backend server.

7. The monitoring device as recited in claim 1, wherein the monitoring device is preconfigured to have a first user account with a first password for administrating and troubleshooting the monitoring device and a second user account with a second password for setting up the monitoring device and a third user account with a third password for troubleshooting the monitoring device by a third-party support organization.

8. The monitoring device as recited in claim 1, wherein the monitoring device is preconfigured with an Uniform Resource Location (URL) address of a client associated with the POS establishment, a moniker identifying the client and an establishment number identifying a location of the POS establishment.

9. A computer-implemented method for monitoring the status of equipment at a point-of-sales (POS) establishment by a monitoring device, the monitoring device performing the steps comprising:

sending a request for a device manifest that includes information of one or more devices preconfigured for installation at the POS establishment to a backend server via a network, the monitoring device is preconfigured prior to being installed in the POS establishment;

receiving, in response to the request, the device manifest from the backend server via the network;

configuring, using the received device manifest, a monitoring software that monitors status of the one or more devices;

sending information of the configured monitoring software to a monitoring server via the network;

causing the monitoring software to collect status information of the one or more devices; and sending the collected status information to the monitoring server via the network;

sending, via a poller script of the monitoring device, a check-in signal to the monitoring server on a regular basis via the network;

receiving information that includes at least one of a new configuration and a binary bundle from the monitoring server via the network;

downloading and unbundling, via the poller script, the received information to the monitoring device; and adjusting a configuration of the monitoring software based on the unbundled information thereby adding new capabilities to the monitoring device.

10. The computer-implemented method as recited in claim 9, further comprising:

receiving a request for a secured communication channel from the monitoring server; and establishing the secured communication channel between the monitoring device and the monitoring server.

* * * * *